Aug. 18, 1942.  A. R. THOMAS  2,293,522
REFRIGERATION
Filed Jan. 9, 1940
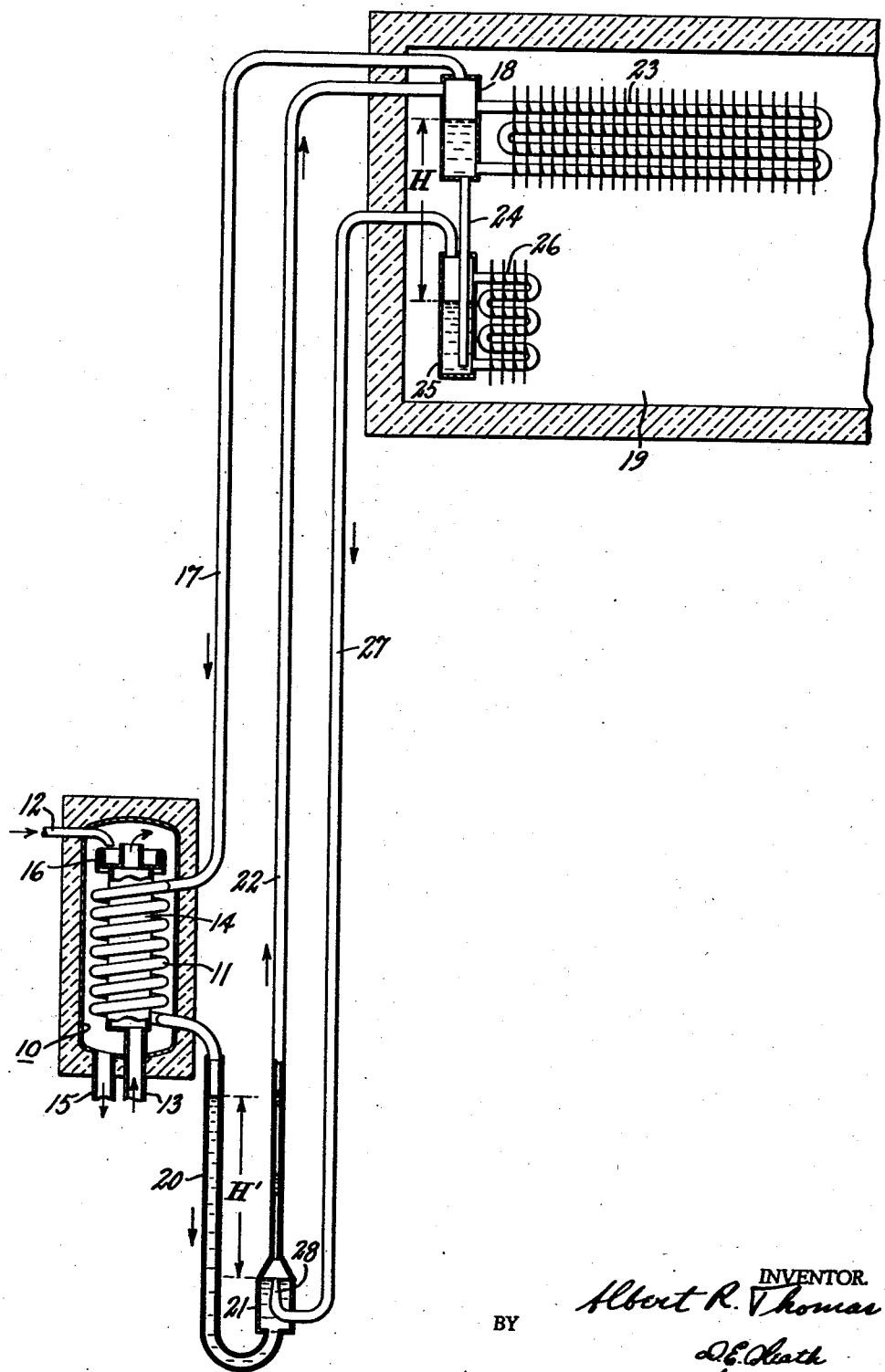
INVENTOR.
Albert R. Thomas
BY
D. E. Heath
his ATTORNEY.

Patented Aug. 18, 1942

2,293,522

UNITED STATES PATENT OFFICE 2,293,522

REFRIGERATION

Albert R. Thomas, Evansville, Ind., assignor to Servel, Inc., New York, N. Y., a corporation of Delaware Application January 9, 1940, Serial No. 313,052

5 Claims. (Cl. 62—125)

My invention relates to refrigeration and more particularly to a heat transfer system by which cooling may be effected at a place above a source of refrigeration.

It is an object of the invention to provide greater efficiency of operation in a system of this character in which heat transfer liquid is raised from a place of condensation to a higher place of evaporation by lift action of vapor from the higher place of evaporation.

The drawing shows more or less schematically a heat transfer system embodying the invention. Cooling element 10 represents a source of refrigeration. It is shown as an evaporator of a uniform pressure absorption type refrigeration system like that described in my application Serial No. 107,852, filed October 27, 1936, now Patent No. 2,207,838. In the evaporator 10 is a pipe coil 11. Liquid refrigerant enters the upper part of evaporator 10 through a conduit 12. Inert gas enters the upper part of evaporator 10 through a conduit 13 and a cylinder 14 which is within the pipe coil 11. Gas leaves the evaporator 10 through conduit 15. Liquid refrigerant from conduit 12 flows into a distributor 16. Liquid is deposited from distributor 16 onto the top of coil 11. The liquid refrigerant flows downward over coil 11 and evaporates and diffuses into the gas, producing a refrigeration effect for cooling the coil 11.

The upper end of coil 11 is connected by a conduit 17 to the top of a vessel 18. Vessel 18 is located in the upper part of a refrigerator storage compartment 19. The lower end of coil 11 is connected by a downwardly looped conduit 20 to the bottom of a vapor lift vessel 21. The top of vessel 21 is connected by a conduit 22 to the upper part of vessel 18. The upper end of a finned evaporator coil 23 is connected to the upper part of vessel 18. The lower end of evaporator coil 23 is connected to the lower part of vessel 18. Vessel 18 forms a header for coil 23. Evaporator coil 23 is located in the upper part of refrigerator compartment 19 and is used to cool air in this compartment during operation of the system as hereinafter described.

The bottom of vessel 18 is connected by a conduit 24 to the lower part of a vessel 25. Vessel 25 is also located in refrigerator compartment 19 but at a level below that of vessel 18. Conduit 24 juts downward in vessel 25 and is open at its lower end near the bottom of vessel 25. The upper end of a finned evaporator coil 26 is connected to the upper part of vessel 25. The lower end of evaporator coil 26 is connected to the lower part of vessel 25. Vessel 25 forms a header for coil 26. Evaporator coil 26 is located below evaporator coil 23 in the refrigerator compartment 19. Whereas evaporator coil 23 and its header 18 are located in the top of refrigerator compartment 19, coil 26 and its header 25 are located in the bottom of compartment 19. The top of header 25 is connected by a conduit 27 to a nozzle 28 which juts upward in vapor lift vessel 21.

Coil 11 and evaporators 23 and 26 together with the above described connections therebetween form a heat transfer system which is evacuated and charged with a suitable heat transfer fluid, such as methyl chloride. When the refrigeration apparatus is started, the evaporator 10 lowers the temperature of coil 11, causing a reduction in pressure in this coil and also in conduit 17, vessel 18 and conduit 22. Due to this reduction in pressure, liquid evaporates in coil 23 producing a cooling effect for cooling air in compartment 19. Vapor flows from the upper end of coil 23 into vessel 18, and thence through conduit 17 to the condenser coil 11. Vapor is condensed to liquid in coil 11. The liquid flows from the lower end of coil 11 into conduit 20, vessel 21, and the lower part of conduit 22.

Liquid also evaporates in evaporator coil 26. The vapor flows from the upper end of coil 26 into vessel 25. Vapor in vessel 25 is segregated from the condenser 11 in one direction by a liquid trap seal formed by liquid in the bottom of vessel 25 and conduit 24. In the other direction, vessel 25 is cut off from the condenser by liquid in conduit 20, vessel 21 and the lower part of conduit 22. Vapor in the upper part of vessel 25 therefore exerts a pressure on liquid in the lower part of this vessel, causing it to rise or back up through conduit 24 into vessel 18, establishing a liquid column of height H.

Vapor flows from the top of vessel 25 through conduit 27 and issues through nozzle 28 in vessel 21. The vapor issuing from nozzle 28 becomes trapped in liquid in the lower part of conduit 22, causing the column of liquid in this conduit to become lighter than the column of liquid in conduit 20. The column of liquid and gas in conduit 22 therefore increases in height until it reaches the upper end of conduit 22 where it overflows into vessel 18. The liquid flows into the lower part of vessel 18 while the vapor joins vapor from evaporator 23 and flows through conduit 17 to condenser coil 11. The liquid column of height H between versels 25 and 18 should equal the liquid column H' between nozzle 28 and the surface level of liquid in conduit 20, and both columns H and H' should equal the height of the gas and liquid column extending from nozzle 28 to the upper end of conduit 22.

The pressure in evaporator 26 is greater than the pressure in evaporator 23 by the height of the liquid column H, so that evaporation takes place in coil 26 at a correspondingly higher temperature than in coil 23. Evaporation of liquid in coil 26 aids in cooling compartment 19. It may be used to pre-cool air circulating over the main coil 23. The vapor produced in coil 26 is used for causing circulation of liquid in the heat transfer circuit as described. This vapor is at a higher pressure than that from coil 23 so that less vapor is required for the lifting action than if the lifting vapor were supplied by evaporator 23. The arrangement also permits the low temperature evaporator 23 to be located in the very top of the refrigerator compartment 19 for most effective cooling of air in this compartment and without the requirement of apparatus projecting above the top of the refrigerator. Also evaporator 23 is connected directly to the condenser coil 11 so that cooling effect of the evaporator 10 of the refrigeration system is transferred to the refrigerator 19 substantially without temperature loss as far as the evaporator 23 is concerned. With respect to evaporator 26, evaporation takes place at a higher temperature, but it also takes place at a higher pressure so that less vapor is required for lifting a given quantity of liquid through a certain height whereby the total efficiency of a heat transfer system of this type is increased.

Various changes and modifications may be made within the scope of the invention as set forth in the following claims.

What is claimed is:

1. A heat transfer system including a closed circuit for volatile fluid having a plurality of places of evaporation, a place of condensation at a level below said places of evaporation, and a bubble type vapor liquid lift for raising liquid from said place of condensation upward to said places of evaporation, said lift utilizing vapor from one of said places of evaporation, said one of said places of evaporation being at a level below another of said places of evaporation, said higher place of evaporation communicating directly with said place of condensation, and said lower place of evaporation being segregated from said place of condensation by said vapor liquid lift on one hand and a liquid column on the other.

2. A heat transfer system as set forth in claim 1 in which said higher place of evaporation is in the upper part of a refrigerator storage compartment and said lower place of evaporation is in a lower part of said compartment.

3. A heat transfer system including a closed circuit for volatile fluid having a first evaporator, a second evaporator below said first evaporator, a conduit for liquid from said first evaporator to said second evaporator having a liquid column forming trap, a condenser below both said evaporators, a vapor liquid lift for delivering liquid to said first evaporator, a conduit for liquid from said condenser to said lift, and a conduit for vapor from said second evaporator to said lift.

4. A heat transfer system as set forth in claim 3 in which said first and second evaporators are located in the top and bottom respectively of a refrigerator storage compartment.

5. A method of heat transfer which includes evaporating liquid refrigerant in a plurality of places at different elevations, condensing vaporous refrigerant to liquid below said places of evaporation, raising condensed liquid by vapor bubble lifting action to said places of evaporation, utilizing for said lift action vapor from one of said places of evaporation which is at a level below another of said places of evaporation, and causing the vapor in said first place of evaporation to be at a pressure above that in said second place of evaporation by maintaining a column of liquid between said places.

ALBERT R. THOMAS.